Jan. 5, 1943.  H. T. VANHOOSER  2,307,172
COMBINATION TRUCK AND PASSENGER VEHICLE
Filed Jan. 29, 1941
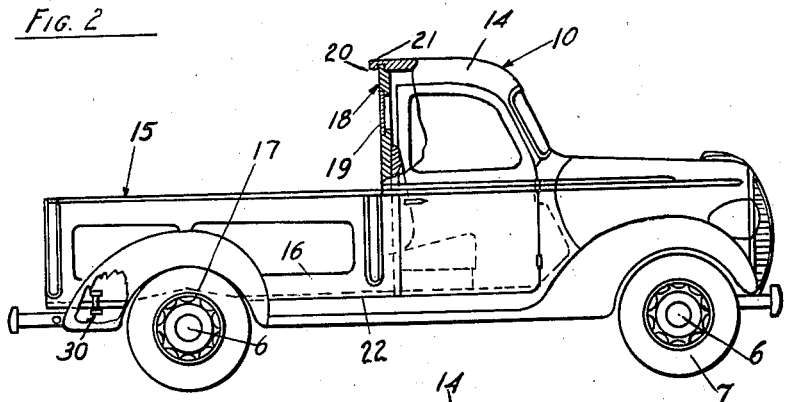
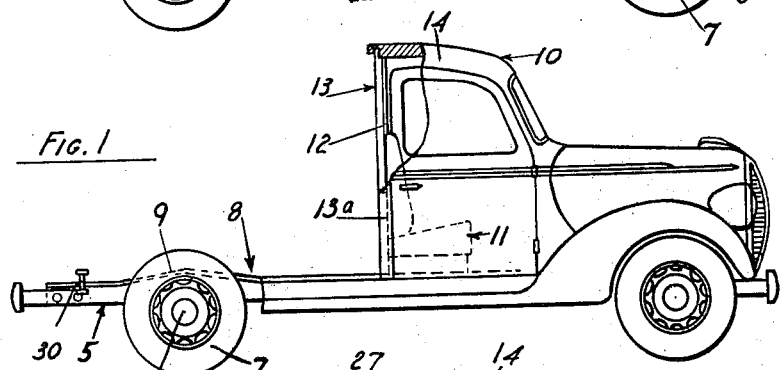
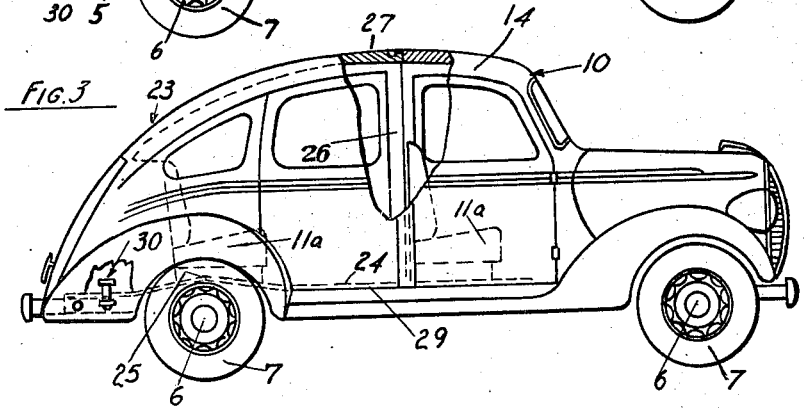
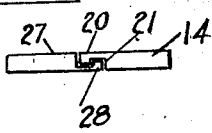
Inventor:
H. T. Vanhooser
by A. E. Fisher
Attorney Patented Jan. 5, 1943

2,307,172

UNITED STATES PATENT OFFICE 2,307,172

COMBINATION TRUCK AND PASSENGER VEHICLE

Harry T. Vanhooser, Muskogee, Okla.

Application January 29, 1941, Serial No. 376,463

1 Claim. (Cl. 296—103)

This invention provides a combination truck and passenger vehicle. The main object of the invention is to provide a chassis including a frame, wheels, engine and cab as common features, and whereon may be removably mounted either a truck body or a passenger car body, alternately as desired, and so that the said chassis may thus be made to serve a double purpose.

Another object of the invention is to provide a vehicle chassis including a floor, a cab mounted permanently at the forward end of the chassis, the said cab being open at the back and generally of a design for association with either a truck body or a passenger car body, a truck body for removably mounting on the chassis back of the cab, for completing the assembly as a truck, the said truck body having at its forward end a closure for the open back of the cab, and a passenger body for removably mounting on the chassis in lieu of the truck body, the said passenger body being open at the front to register with the open-backed cab of the chassis when mounted thereon, for completing the assembly as a passenger car.

With the foregoing objects in view a preferred embodiment of the invention and the elements thereof, is shown in the drawing, wherein:

Figure 1 is a side elevation of a vehicle chassis as contemplated by this invention, the rear upper corner of the right side of the cab being broken out to show the construction.

Figure 2 is a view similar to Figure 1, showing a truck body designed in accordance with this invention, mounted on the chassis.

Figure 3 is a view similar to 1 and 2, showing however a passenger car body or tonneau on the chassis in lieu of the truck body.

Figure 4 is a fragmentary detail on an enlarged scale, showing the method of interlocking the frontal cover plate of the truck body and the roof of the passenger tonneau, with the rear margin of the cab roof of the chassis.

The invention comprises a chassis frame 5, supported upon axles 6 and wheels 7 arranged at front and rear, and provided with a floor 8 bowed or arched transversely at 9 over the rear axle 6. A conventional engine (not shown) is mounted at the front end of the chassis frame, and a cab 10 with seats 11 is permanently mounted back of the engine, in conventional manner.

In accordance with my invention, the back of the cab is left open as indicated at 12, this opening being defined by the floor 8, the lateral angle-posts or uprights 13 seated at their lower ends in the floor 8, and the roof 14 anchored atop the upper ends of the posts 13. The webs of the angle-posts 13 at each side are turned one inwardly and the other rearwardly to form flanged angles or settings 13a for the lateral margins of the cover plate later described.

In accordance with my invention a truck body 15 is provided, the same having a floor 16, arched at 17 to fit over the arched portion 9 of the chassis floor 8, and whereby these floors are held together against longitudinal slippage. A flat, rectangular closure or cover plate 18 is vertically erected at the front end of the truck body, same being anchored along its lower edge to the floor 16, and laterally to the sides 17 of the body 15. This plate 18 is provided with a window 19 in its upper portion. The plate 18 is adapted to exactly and nicely fit within the angles 13a of the posts 13, to close the opening 12 at the back of the cab, when properly mounted in place.

In order to lock the forward end of the truck body in place, the rear margin of the cab roof 14 is extended back to provide a ledge 20, which is grooved or channeled transversely along its under side as at 21 to releasably engage the upper edge of the cover plate 18. Thus by tipping up the rear end of the body 15 and sliding the plate 18 forward under the ledge 20 and then lowering the rear end of the body, the upper edge of the plate enters the channel and is thus held against slipping rearward. The sides of the body 15 are also dropped as at 22 below sides of the floor 16, for laterally embracing the sides of the chassis floor 8, for retaining the body against lateral slippage.

A passenger body or tonneau 23 is provided, the same having a floor 24, arched at 25 to sit over the arch 9 of the chassis floor 8, and provided with seats 11a. The front of this tonneau is left open, as at 26 and the frontal margins of the tonneau defining this opening are adapted to nicely fit between the posts 13 and within the angles thereof. The forward margin of the roof 27 is formed with an under lip 28 adapted to engage the channel 21 of the cab roof 14, similarly to the engagement of the truck cover plate 18, and for the same purpose of releasably locking the elements together.

Similarly and for a similar purpose the sides of the tonneau 23 are dropped as at 29 for laterally embracing the sides of the chassis floor 8. The tonneau 23 is removably mounted on the chassis in manner similar to the mounting of the truck body 15.

The truck body and tonneau may be additionally bolted in place, if desired, in any conventional manner, as by bolts 30 passed through the floors 8 and 16, or 8 and 24.

It is thought from the foregoing description the practice of the invention will be fully understood, and while I have here shown and described certain structural features of the invention, these features may be changed or modified within the scope of the claim. Obviously a covered truck body could be substituted for the open truck or passenger tonneau, and in such case the front end of the covered truck could be left open. Also all channels and joints where body parts come together to form joints may be lined with rubber beading to prevent rattling and to exclude water. Also the running boards may be constructed so as to be separable from the rear fenders of the truck body or passenger tonneau.

I claim:

In combination with a vehicle cab open at the back having a tongue and groove across a top marginal edge thereof adapted to interconnect with various types of interchangeable vehicle bodies and a chassis supporting said cab having a kick-up rearwardly of the cab projecting upwardly from the rear of said chassis adapted to interengage with a complementary recess in the floor of various types of demountable vehicle bodies; a suitable type demountable vehicle body having a tongue across a top marginal edge thereof adapted to fit within said groove across said top marginal edge of said cab to form a joint to connect said cab and vehicle body together, along their respective top marginal edges, a kick-up in the floor of said vehicle body complementary to said chassis kick-up to provide a recessed portion adapted to align and nest over said chassis kick-up when said cab and vehicle body are joined together at their respective top marginal edges to prevent longitudinal movement of said vehicle body on said chassis and thereby substantially reduce stress at the cab and vehicle body top connection from longitudinal movement, guide means on each side of the cab opening extending from the top edge of the cab to the chassis adapted to guide and overlap the sides of a demountable vehicle body during connecton to the cab and to prevent lateral movement of said demountable body to substantially reduce stress from lateral movement at the cab and vehicle body top connections, and lock means back of said chassis kick-up adapted to lock said vehicle body to said chassis when same is placed in proper alignment over the chassis to prevent vertical movement of the rear part of said vehicle body from the chassis and to thereby maintain a substantially rigid connection between the demountable vehicle body, cab and chassis at their respective points of connection.

HARRY T. VANHOOSER.